United States Patent
Kwon et al.

(10) Patent No.: US 8,787,910 B2
(45) Date of Patent: Jul. 22, 2014

(54) APPARATUS AND METHOD FOR TERMINAL HANDOVER BETWEEN SYSTEMS USING DIFFERENT FREQUENCY ALLOCATIONS

(75) Inventors: Il-Won Kwon, Ansan-si (KR); Sang-Min Lee, Seoul (KR); Dai-Kwan Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 461 days.

(21) Appl. No.: 12/321,492

(22) Filed: Jan. 22, 2009

(65) Prior Publication Data

US 2009/0186615 A1    Jul. 23, 2009

(30) Foreign Application Priority Data

Jan. 22, 2008 (KR) .................. 10-2008-0006655

(51) Int. Cl.
*H04W 36/00* (2009.01)
(52) U.S. Cl.
USPC ........... 455/436; 455/438; 455/444; 455/450; 370/338
(58) Field of Classification Search
USPC .......... 455/436, 438, 456, 450, 444; 370/338, 370/332, 252
See application file for complete search history.

(56) References Cited

U.S. PATENT DOCUMENTS

| | | | |
|---|---|---|---|
| 7,573,846 B2* | 8/2009 | Rue et al. ................. | 370/329 |
| 2007/0097939 A1* | 5/2007 | Nylander et al. ........... | 370/338 |
| 2008/0132239 A1* | 6/2008 | Khetawat et al. ........... | 455/438 |
| 2008/0305801 A1* | 12/2008 | Burgess et al. ............. | 455/444 |
| 2009/0040972 A1* | 2/2009 | Robson et al. ............. | 370/329 |
| 2009/0061821 A1* | 3/2009 | Chen et al. ................. | 455/411 |
| 2009/0163216 A1* | 6/2009 | Hoang et al. ............... | 455/450 |
| 2009/0257361 A1* | 10/2009 | Deshpande et al. .......... | 370/252 |
| 2010/0093355 A1* | 4/2010 | Voyer et al. ................ | 455/436 |

FOREIGN PATENT DOCUMENTS

JP       2693924       9/1997

OTHER PUBLICATIONS

Notice of Preliminary Rejection dated Mar. 14, 2014 in connection with Korean Application No. 10-2008-0006655, 12 pages.

* cited by examiner

*Primary Examiner* — Kashif Siddiqui
*Assistant Examiner* — Shahriar Behnamian

(57) ABSTRACT

An apparatus and a method for a terminal handover between systems using different Frequency Allocations (FAs) are provided. The method includes broadcasting an indication signal to inform of existence of the terminal in a coverage of a macro base station to which an indoor base station is registered; and when receiving a handover command message of the indoor base station, from the macro base station, performing a handover procedure to the indoor base station. The base station can efficiently utilize the control channel resource and the user terminal needs not to conduct the unnecessary scanning procedure. Thus, the time and the power required for the scanning can be spared.

22 Claims, 3 Drawing Sheets

APPARATUS AND METHOD FOR TERMINAL HANDOVER BETWEEN SYSTEMS USING DIFFERENT FREQUENCY ALLOCATIONS

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jan. 22, 2008 and assigned Serial No. 10-2008-0006655, the entire disclosure of which is hereby incorporated by reference.

TECHNICAL FIELD OF THE INVENTION

The present invention relates generally to a handover. More particularly, the present invention relates to an apparatus and a method for a terminal handover between systems using different Frequency Allocations (FAs).

BACKGROUND OF THE INVENTION

In a broadband wireless access system under a typical cellular environment, as time goes by during communications, the communication condition with other neighbor base stations may be better than a previous serving base station because of movement or propagation environment change of a subscriber terminal, or sudden increase of subscriber terminals in a particular cell. In this situation, the subscriber terminal, the serving base station, and the neighbor base stations have to efficiently recognize the change in the communication environment and to establish a communication path anew using an optimal base station.

In a conventional method, when a handover to a neighbor cell or a neighbor sector is needed according to changes in the communication environment of the user, the user terminal synchronizes with neighbor base stations based on a MOBile_ NeighBoR-ADVertisement (MOB_NBR-ADV) message and a MOBile_SCaNning-ReSPonse (MOB_SCN-RSP) message from the serving base station and conducts a scanning process to measure the channel status. The scanning process is performed with neighbor base stations in sequence based on a neighbor base station list contained in the MOB_NBR-ADV message.

Since the conventional MOB_NBR-ADV message is broadcasted to every user within the cell at the same time, the message should include information relating to every neighbor base station to which the users may hand over. Accordingly, when a plurality of indoor base stations is present in the cell or when multiple communication modes are present in the same space and base stations of the various modes are mixed up, the number of the base stations recorded in the MOB_NBR-ADV message increases. At the base station, disadvantageously, the capacity of the message carrying the information relating to the neighbor base stations rises. At the terminal, as the number of the base stations to scan increases, the scanning duration is lengthened. Ultimately, the data reception time from the existing base station is decreased by the scanning duration, thus lowering the system throughput and raising the power consumption during the scanning.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for a terminal handover between systems using different Frequency Allocations (FAs).

Another aspect of the present invention is to provide an apparatus and a method for a terminal handover from a macro base station to an indoor base station by omitting a scanning process of the terminal in a coverage of the macro base station to which the indoor base station is registered, without using location information of a user terminal or a MOBile_NeighBoR-ADVertisement (MOB_NBR-ADV) message which causes an overhead problem in the conventional method.

According to one aspect of the present invention, a method for a handover of a terminal includes broadcasting an indication signal to indicate the presence of the terminal in a coverage of a macro base station to which an indoor base station is registered; and when receiving a handover command message of the indoor base station, from the macro base station, performing a handover procedure to the indoor base station.

According to another aspect of the present invention, an operation method of an indoor base station for a handover of a terminal includes monitoring an indication signal broadcasted by the terminal to indicate the presence of the terminal, in a coverage of a macro base station to which the indoor base station is registered; and when detecting the indication signal, transmitting a handover request message of the terminal to the macro base station.

According to yet another aspect of the present invention, an apparatus for a handover of a terminal includes a means for broadcasting an indication signal to inform of the presence of the terminal in a coverage of a macro base station to which an indoor base station is registered; and a means for, when receiving a handover command message of the indoor base station from the macro base station, performing a handover procedure to the indoor base station.

According to still another aspect of the present invention, an apparatus of an indoor base station for a handover of a terminal includes a means for monitoring an indication signal broadcasted by the terminal to inform of the presence of the terminal, in a coverage of a macro base station to which the indoor base station is registered; and a means for, when detecting the indication signal, transmitting a handover request message of the terminal to the macro base station.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
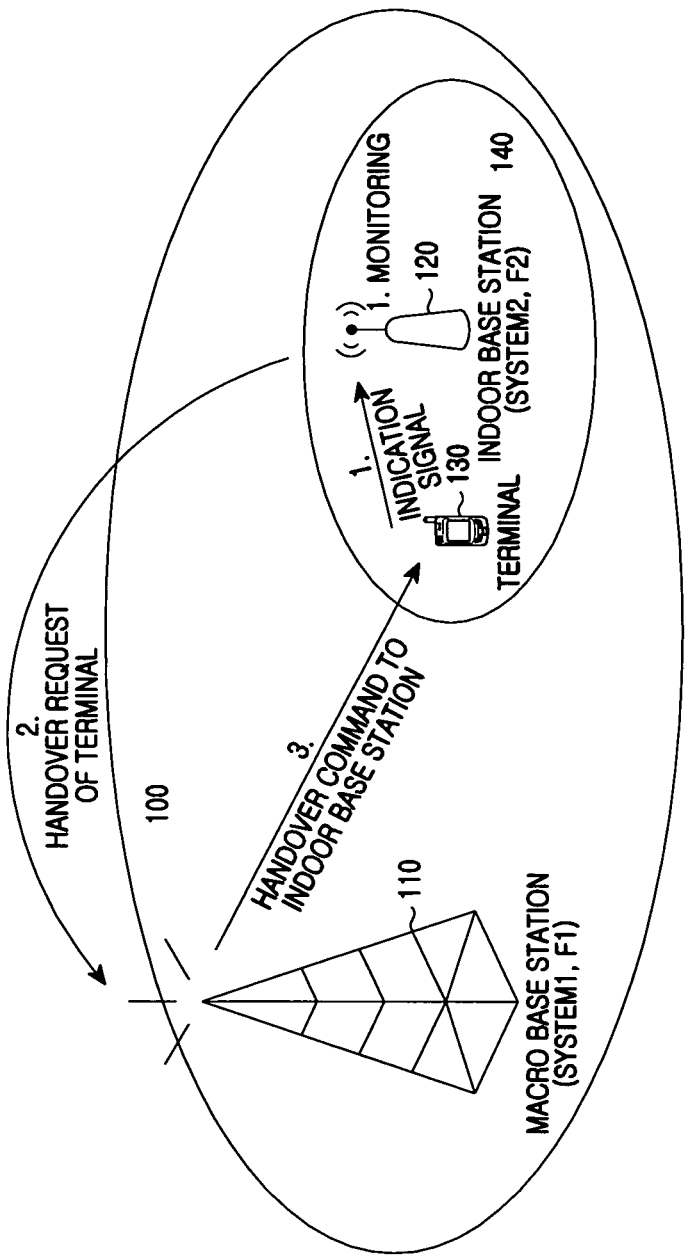
FIG. 1 is a simplified diagram of an environment where systems using different Frequency Allocations (FAs) are present together according to an exemplary embodiment of the present invention.
Figure 2:
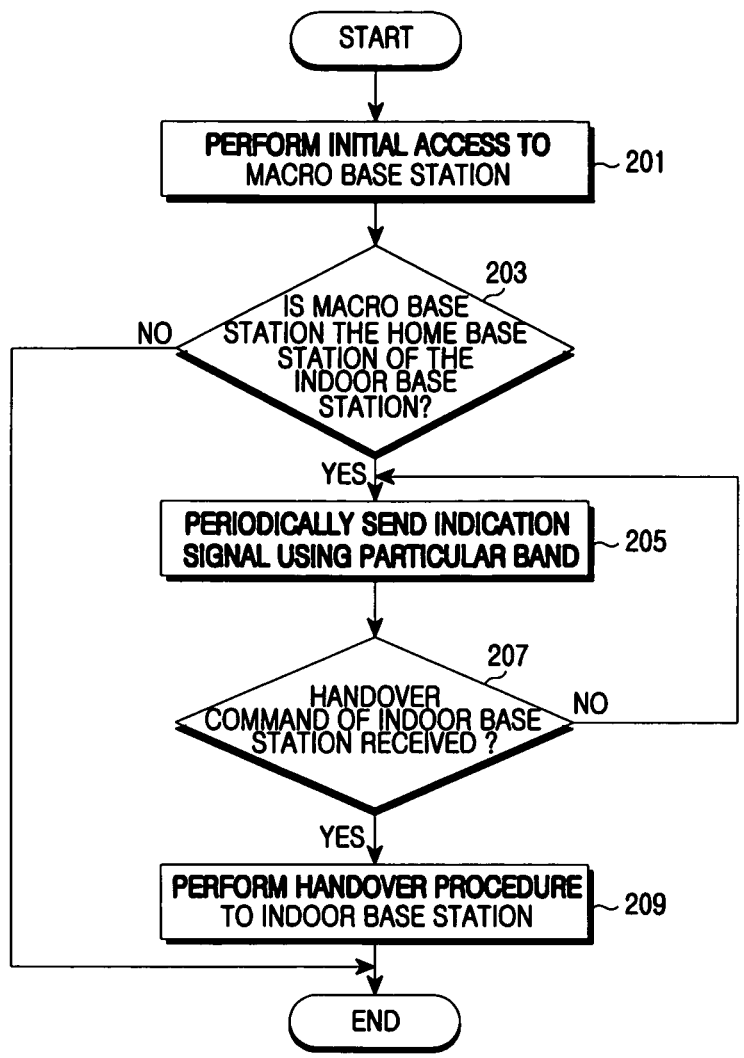
FIG. 2 is a flowchart of operations of a terminal for handing over from a macro base station to an indoor base station according to an exemplary embodiment of the present invention.
Figure 3:
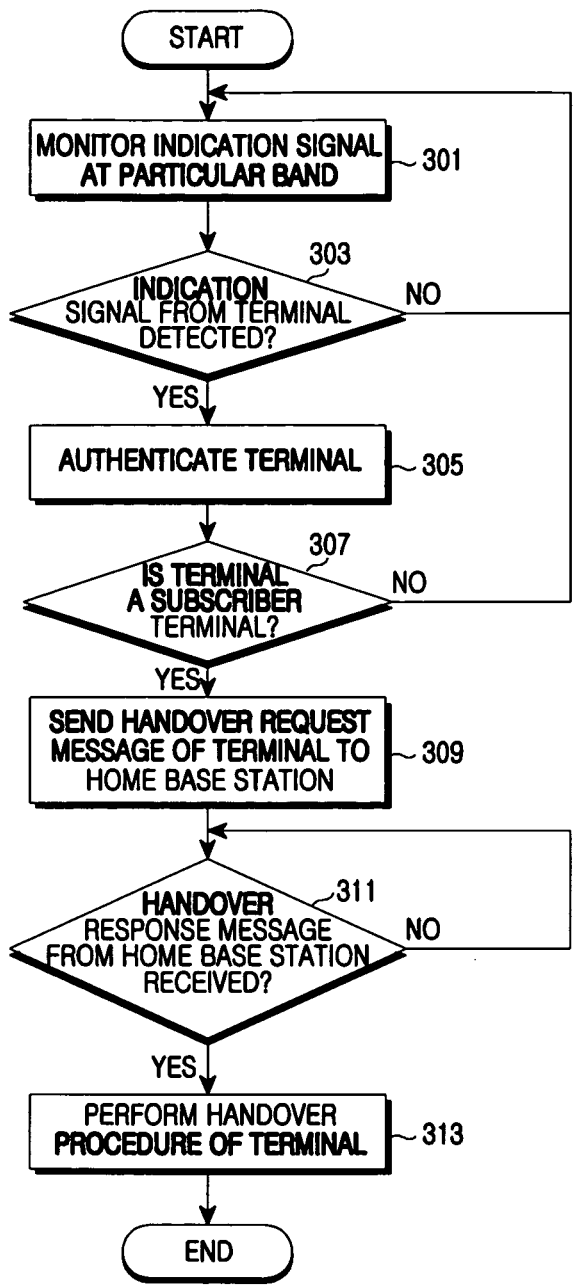
FIG. 3 is a flowchart of operations of the indoor base station for the terminal handover from the macro base station to the indoor base station according to an exemplary embodiment of the present invention.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide an apparatus and a method for a terminal handover between systems using different Frequency Allocations (FAs).

Particularly, in the coverage of a macro base station to which an indoor base station is registered, without using location information of a user terminal or a MOBile_NeighBoR-ADVertisement (MOB_NBR-ADV) message which causes an overhead problem in the conventional method, the present invention provides the apparatus and the method for the terminal handover from the macro base station to the indoor base station by omitting a scanning process of the terminal. Since the location information of the user terminal is not used, the present invention is applicable to terminals having no Global Positioning Satellite (GPS) function.

Hereinafter, while the macro station, which is a first system (system1) using the frequency band f1, and the indoor base station, which is a second system (system2) using a frequency band f2, are present together, the present invention is applicable to any case where systems using different FAs coexist. Herein, the macro base station is a home base station of the indoor base station (that is, a base station to which the indoor base station is registered).

FIG. 1 is a simplified diagram of an environment where systems using different FAs are present together according to an exemplary embodiment of the present invention.

In FIG. 1, it is assumed that the macro base station 110, which is the first system using the frequency band f1, and the indoor base station 120, which is the second system using the frequency band f2, coexist and that the macro base station 110 is a home base station of the indoor base station 120 (that is, a base station to which the indoor base station 120 is registered). The coverage of the indoor base station 120 is relatively smaller than that of the macro base station 110. It is assumed that a plurality of the indoor base stations 120 lies in a cell coverage 100 of the macro base station 110, and that an initial access of a user terminal 130 is made via the macro base station 110.

After the initial access to the macro base station 110, to hand over to the indoor base station 120 with better condition than the macro base station 110 within the cell coverage 100 of the macro base station 110, the terminal 130 broadcasts a periodic indication signal using a particular uplink band (1). The indoor base station 120 monitors the indication signal of the particular uplink band transmitted from the terminal 130 (1). Upon detecting the indication signal, the indoor base station 120 recognizes the entrance of the corresponding terminal 130 to its cell coverage 140 and transmits a handover request message of the terminal 130 to the macro base station 110 (that is, to the home base station of the indoor base station 120) over a backbone network (2). The macro base station 110 decides whether to accept or reject the handover of the terminal 130. Upon deciding to accept the handover, the macro base station 110 can order the terminal 130 to hand over to the indoor base station 120 (3). Also, the macro base station 110 can send a handover response message including the handover acceptance or the handover rejection to the indoor base station 120.

Herein, the indication signal is transmitted by the terminal 130 using a resource agreed by the terminal 130 and the indoor base station 120 in advance, for example, using a particular uplink band. The indoor base station 120 can monitor the indication signal from the terminal 130 easily using the resource. The indication signal is transmitted as a weak signal (that is, with a low signal strength) such that the indication signal is transmitted only within a radius of several meters from the terminal 130. Accordingly, indication signals from neighbor terminals not entering the cell coverage 140 of the indoor base station 120 are not received at the indoor base station 120. Only the indication signal from the terminal entering the cell coverage 140 of the indoor base station 140 from several meters away is detected by the indoor base station 120.

FIG. 2 is a flowchart of operations of the terminal for handing over from the macro base station to the indoor base station according to an exemplary embodiment of the present invention.

Upon entering the cell coverage 100 of the macro base station 110, the terminal 130 performs the initial access to the macro base station 110 in step 201. In step 203, the terminal 130 checks whether the macro base station 110 of the initial access is the home base station of the indoor base station 120 to which the terminal 130 is registered in advance. To determine whether the macro base station 110 is the home base station of the indoor base station 120, the terminal 130 can compare an IDentifier (ID) of the serving cell with a home cell ID of the indoor base station 120.

When the macro base station 110 is the home base station of the indoor base station 120 to which the terminal 130 is registered in advance in step 203, the terminal 130 periodically broadcasts the indication signal using the particular uplink band agreed upon with the indoor base station 120 in advance so as to inform of its presence in step 205. Herein, the indication signal includes ID of the terminal 130. Thus, the terminal 130 can advertize its presence by periodically sending the indication signal.

In step 207, the terminal 130 checks whether a handover command message of the indoor base station 120 is received from the macro base station 110. Not receiving the handover command message of the indoor base station 120, the terminal 130 goes back to step 205 and repeats the subsequent steps. By contrast, receiving the handover command message of the indoor base station 120, the terminal 130 carries out a handover procedure to the indoor base station 120 in step 209.

When the macro base station 110 is not the home base station of the indoor base station 120 to which the terminal 130 is registered in step 203, the terminal 130 finishes this process. In this embodiment of the present invention, the terminal 130 transmits the indication signal within a specific cell of the indoor base station 120 to which the terminal 130 is pre-registered, not throughout every cell. Thus, the overhead caused by the indication signal transmission of the terminal 130 can be reduced.

FIG. 3 is a flowchart of operations of the indoor base station for the terminal handover from the macro base station to the indoor base station according to an exemplary embodiment of the present invention.

In step 301, the indoor base station 120 monitors the indication signal periodically broadcasted by the terminal 130 which enters the cell coverage 140 of the indoor base station 120 using the particular uplink band agreed upon by the terminal 130 and the indoor base station 120 in advance so as to inform of the presence of the terminal 130. In step 303, the indoor base station 120 checks whether the indication signal from the terminal 130 is detected or not. Detecting no indication signal, the indoor base station 120 goes back to step 301 and repeats the subsequent step. Upon detecting the indication signal, the indoor base station 120 recognizes the entrance of the corresponding terminal 130 into its cell coverage 140 and authenticates the terminal 130 using the terminal ID contained in the indication signal (that is, examines the access and handover possibilities of the terminal 130) in step 305.

In step 307, the indoor base station 120 checks whether the terminal 130 is subscribed or not according to the authentication procedure. When the terminal 130 is not a subscriber terminal, the indoor base station 120 returns to step 301. When the terminal 130 is a subscriber terminal, the indoor base station 120 sends a handover request message to its registered home base station 110 to request the handover of the terminal 130 in step 309. Herein, the handover request message can be transmitted through the backhaul or a specific channel, and includes the indoor base station ID and the terminal ID of the current handover request.

The home base station 110, receiving the handover request message, can decide to allow or reject the handover request and transmits a handover response message including the determination result to the indoor base station 120. When deciding to accept the handover request, the home base station 110 can send the handover command message instructing the handover to the indoor base station 120 to the terminal 130. In step 311, the indoor base station 120 checks whether the handover response message is received from the home base station 110. Upon receiving the handover response message of the terminal 130, the indoor base station 120 performs the handover procedure of the terminal 130 according to the received handover response message in step 313. Herein, the handover procedure of the terminal 130 is conducted only when the handover response message includes handover request acceptance information.

Next, the indoor base station 120 finishes this process.

According to the apparatus and the method for the terminal handover from the macro base station to the indoor base station by omitting the scanning procedure of a terminal in the coverage of the macro base station to which the indoor base station is registered, without using the location information of the user terminal or the MOB_NBR-ADV message which causes overhead problem in the conventional method, the base station can efficiently utilize the control channel resource and the user terminal needs not conduct the unnecessary scanning procedure. Thus, the time and the power required for the scanning can be spared. Further, the present method can realize more flexible handover operation by reducing the scanning time and be applied to terminals having no GPS function because the location information of the user terminal is not used at all.

While the invention has been shown and described with reference to certain exemplary embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for a handover of a terminal, the method comprising:
   performing, at the terminal, initial access to a macro base station which includes a coverage of a small base station within a coverage of the macro base station, the macro base station operating in a different frequency band than the small base station;
   checking, at the terminal, whether the terminal can perform a handover to the small base station by comparing an identifier of the small base station with an identifier of the macro base station;
   transmitting, at the terminal, an indication signal for the handover when the terminal can perform the handover to the small base station, the indication signal comprising at least identifier information of the terminal;
   receiving, at the terminal, a handover command message to the small base station from the macro base station; and
   upon receiving the handover command message to the small base station from the macro base station, performing, at the terminal, a handover procedure to the small base station, wherein the terminal is registered to the small base station in advance;
   wherein the identifier of the small base station is compared with the identifier of the macro base station before the handover.

2. The method of claim 1, wherein the indication signal comprises terminal IDentifier (ID) information.

3. The method of claim 1, wherein the indication signal is transmitted with a low signal strength so that the indication signal is received only within a predetermined radius from the terminal.

4. The method of claim 1, wherein the indication signal is transmitted using a resource designated by agreement between the terminal and the small base station in advance.

5. An operation method performed at a small base station for a handover of a terminal, the method comprising:
   monitoring, at the small base station, an indication signal for a handover transmitted by the terminal to inform of a presence of the terminal in a coverage of a macro base station to which the small base station is registered, upon (i) entering of the terminal into a coverage area of the macro base station which is a home base station of the small base station to which the terminal is registered and (ii) a comparison by the terminal of an identifier of the small base station with an identifier of the macro base station, the indication signal comprising identifier information of the terminal, the macro base station operating in a different frequency band than the small base station; and
   when detecting the indication signal, transmitting, at the small base station, a handover request message of the terminal to the macro base station;

wherein the identifier of the small base station is compared with the identifier of the macro base station before the handover.

6. The operation method of claim 5, wherein the indication signal comprises terminal IDentifier (ID) information.

7. The operation method of claim 5, wherein the indication signal is transmitted with a low signal strength so that the indication signal is received only within a radius of several meters from the terminal.

8. The operation method of claim 5, wherein the indication signal is transmitted using a resource designated by agreement between the terminal and the small base station in advance.

9. The operation method of claim 5, further comprising:
upon detecting the indication signal, authenticating the terminal using information contained in the indication signal.

10. The operation method of claim 5, wherein the handover request message comprises at least one of small base station ID information and terminal ID information.

11. The operation method of claim 5, further comprising:
when receiving a handover response message which comprises handover acceptance information of the terminal from the macro base station, performing a handover procedure of the terminal.

12. An apparatus for a handover of a terminal, the apparatus comprising:
a means for checking, upon performing initial access to a macro base station which includes a coverage of a small base station within a coverage of the macro base station, whether the terminal can perform a handover to the small base station by comparing an identifier of the small base station with an identifier of the macro base station, and for transmitting an indication signal for the handover when the terminal can perform the handover to the small base station, the indication signal comprising at least identifier information of the terminal; and
a means for, upon receiving a handover command message to the small base station from the macro base station, performing a handover procedure to the small base station,
wherein the macro base station operates in a different frequency band than the small base station, and wherein the terminal is registered to the small base station in advance; and
wherein the identifier of the small base station is compared with the identifier of the macro base station before the handover.

13. The apparatus of claim 12, wherein the indication signal comprises terminal IDentifier (ID) information.

14. The apparatus of claim 12, wherein the indication signal is transmitted with a low signal strength so that the indication signal is received only within a radius of several meters from the terminal.

15. The apparatus of claim 12, wherein the indication signal is transmitted using a resource designated by agreement between the terminal and the small base station in advance.

16. An apparatus of a small base station for a handover of a terminal, the apparatus comprising:
a means for monitoring an indication signal for a handover transmitted by the terminal to inform of a presence of the terminal in a coverage of a macro base station to which the small base station is registered, upon (i) entering of the terminal into a coverage area of the macro base station which is a home base station of the small base station to which the terminal is registered and (ii) a comparison by the terminal of an identifier of the small base station with an identifier of the macro base station, the indication signal comprising identifier information of the terminal; and
a means for, upon detecting the indication signal, transmitting a handover request message of the terminal to the macro base station, wherein the macro base station operates in a different frequency band than the small base station; and
wherein the identifier of the small base station is compared with the identifier of the macro base station before the handover.

17. The apparatus of claim 16, wherein the indication signal comprises terminal IDentifier (ID) information.

18. The apparatus of claim 16, wherein the indication signal is transmitted with a low signal strength so that the indication signal is received only within a radius of several meters from the terminal.

19. The apparatus of claim 16, wherein the indication signal is transmitted using a resource designated by agreement between the terminal and the small base station in advance.

20. The apparatus of claim 16, further comprising:
a means for, upon detecting the indication signal, authenticating the terminal using information contained in the indication signal.

21. The apparatus of claim 16, wherein the handover request message comprises at least one of small base station ID information and terminal ID information.

22. The apparatus of claim 16, further comprising:
a means for, upon receiving a handover response message which comprises handover acceptance information of the terminal from the macro base station, performing a handover procedure of the terminal.

* * * * *